INVENTOR.
GEORGE V. MUMFORD
BY Philip M. Rice
& E. J. Holler
ATTORNEYS

# United States Patent Office 3,564,805
Patented Feb. 23, 1971

3,564,805
METHOD FOR DECAPPING AND RECAPPING CONTAINERS
George V. Mumford, Toledo, Ohio, assignor to Owens-Illinois, Inc., a corporation of Ohio
Filed Apr. 9, 1969, Ser. No. 814,532
Int. Cl. B65b *3/04, 7/28*
U.S. Cl. 53—15
18 Claims

ABSTRACT OF THE DISCLOSURE

Method for removing temporary plastic dust covers from containers, filling the containers and reapplying an assembled closure upon the container. The plastic dust cover is mechanically removed from an empty bottle by telescoping thereon an overcap and causing the liner to lock into the interior of the overcap. Where it is impracticable to mechanically lock the dust cover into the overcap, the plastic dust cover is removed from the empty bottle by first coating the dust cover with an adhesive, telescoping thereon an overcap and bonding the dust cover to the overcap. When the overcap is removed prior to filling the bottle, the plastic dust cover is retained against the bottom of the overcap forming a permanent liner for the overcap. The combined overcap and dust cover are reapplied to the container after it is filled, thereby providing a simple means to assemble the components of the composite closure assembly.

THE INVENTION

This invention relates to a method for decapping unfilled containers and later recapping them. More particularly, the invention relates to a method for removing a temporary plastic dust cover from the top of a container before filling by telescoping thereon a preformed shell or overcap, causing the dust cover to adhere or lock to the shell upon removal and then reapplying the shell and the retained dust cover over the top of the container to form a composite closure.

In the glass container industry, newly-formed containers are not always immediately shipped directly to the customer for filling, but may be stored in a warehouse. Since a newly-formed glass container is, in effect, sterilized during its manufacture, it is sometimes necessary to take precautions against entrance of foreign material into the preformed container and to prevent contamination of the packaged material when the container is subsequently filled.

In this invention, in order to maintain the interior of a new container in a sterile condition, it is sealed off with a temporary resilient dust cover immediately after its formation in the glass plant. When the sealed container arrives at the bottler's plant, the bottler need not process the container through an expensive sterilization procedure, but need only remove the dust cover closure, fill the bottle, and reseal the container after it is filled.

Heretofore, the temporary dust covers have been mechanically removed by gripping the edge of the cover and tearing it from the container as disclosed in U.S. Pat. No. 2,995,883. The removed covers were then discarded. This procedure, of course, led to higher production costs since the covers were not reused. Accordingly, the present invention is directed to a method for removing the temporary dust cover from a container to facilitate the filling of the container and reusing the dust cover after the container is filled as a liner in conjunction with the assembled overcap.

More specifically, the present invention is directed to a unique method for removing temporary dust covers from empty containers and positioning the removed dust cover in an overcap to act as a permanent liner, wherein the removal and positioning is accomplished all in one step, rather than two or more steps as taught by the prior art. The dust covers may be removed under this invention either by mechanical means or by means of an adhesive.

If the covers are removed by mechanical means, a preformed rigid overcap or shell containing means to lock the dust cover to the interior of the shell is telescoped upon the bottle and the cover. This locking device may consist of an annular groove formed within the skirt of the overcap which securely engages the skirt portion of the resilient liner as the overcap is telescoped upon the liner. When the overcap is later removed prior to filling, the dust cover is retained to the underside of the overcap and becomes a permanent liner for the composite closure assembly when the assembly is later applied to the container after filling.

The dust covers may also be removed under this invention by first applying to the top thereof or to the interior of the later applied shell a pressure-sensitive adhesive or a heat-sensitive adhesive. Of course, it is understood that it would be obvious to one skilled in the art to cohesively bond the dust cover to the overcap, thereby eliminating the step of applying an adhesive between the dust cover and the overcap after the dust cover leaves its application station. A rigid overcap or shell is telescoped upon the bottle and the cover. The top of the bottle-closure combination is then struck by a pressure roller or momentarily subjected to heat, thereby causing the dust cover to adhere to the underside of the overcap. The adhered dust cover now becomes a permanent liner for the composite closure assembly when the assembly is later applied to the container after filling. In this manner, the temporary dust cover can be removed from an empty container and positioned within a rigid overcap all in one step. Since this can be accomplished without added labor in the same operation previously used to remove dust covers, a substantial saving in manufacturing costs will result.

Therefore, an object of the present invention is to provide a method for applying a dust cover to a container, for removing the dust cover prior to filling and reusing the same dust cover as a liner for the composite closure assembly to be later applied to the container after it is filled.

Another object of this invention is to provide a method for removing temporary dust covers from empty bottles and positioning them as a permanent liner within a rigid overcap all in one step or operation.

It is an object of the present invention to provide a simple means to remove dust covers from containers as they are moved along by a conveyor, without interrupting the forward movement of the containers.

The specific nature of this invention, as well as other objects and advantages thereof, will become apparent to those skilled in the art from the following detailed description taken in conjunction with the annexed sheet of drawings on which, by way of example only, the preferred embodiment of this invention is illustrated.

IN THE DRAWINGS

AS SHOWN IN THE DRAWINGS

Figure 1:
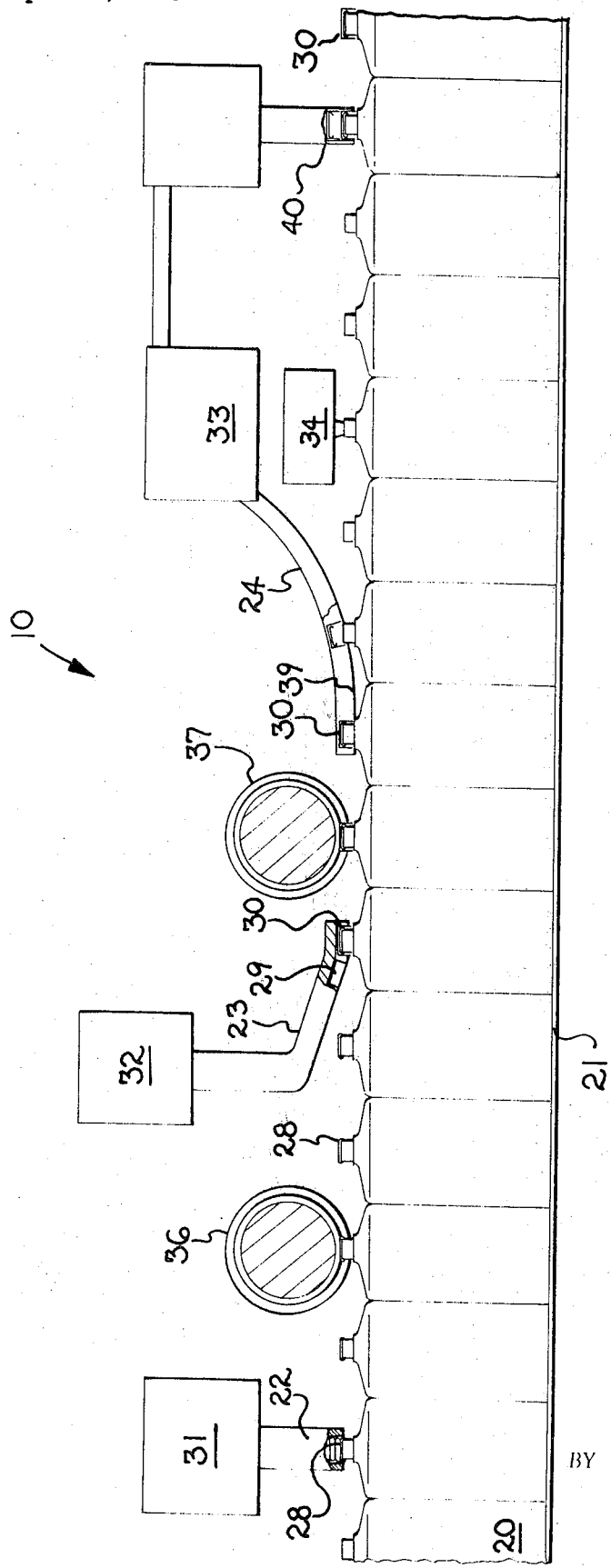
FIG. 1 is a schematic drawing illustrating the steps involved in practicing the method.

In FIG. 1, reference numeral 10 refers generally to a machine for capping, decapping, filling and recapping bottles. Although it is not intended to restrict this invention to use with glass bottles, where glass bottles are involved, it is intended that the dust covers be applied to the bottles immediately upon their removal from the annealing lehr to the bottle manufacturer's plant. Thus, their sterility can be maintained until the bottles reach the bottler's plant and are placed upon the conventional filling line.

When bottles 20 come from a glass annealing lehr, they are in a sterile state. As the bottles move along a predetermined path by an endless conveyor 21, they are positioned under a dust cover station 22 through which dust cover supply 31 furnishes combination dust covers and cap cover liners 28 which are forcibly positioned on rim 19 of the mouth of bottles 20. Dust covers 28 can be applied to the sterile bottles by any means which is presently used in the art.

Figure 2:
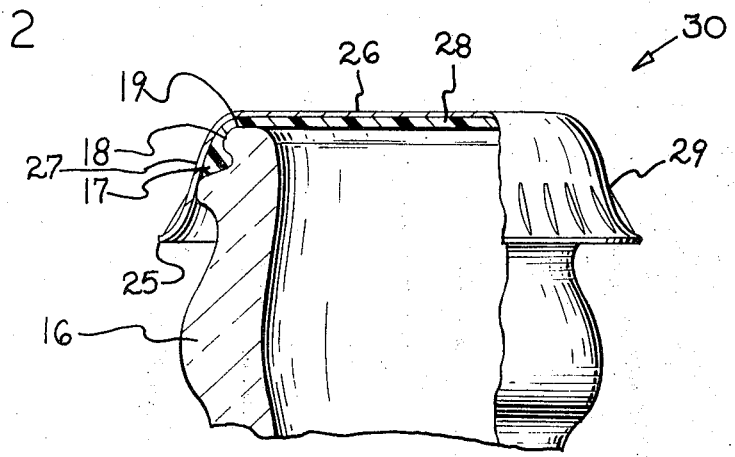
FIG. 2 is a fragmentary detailed sectional view of a combined dust cover liner and a crown overcap prior to deforming said overcap to the container wherein the cover liner and overcap are secured together so that the dust cover becomes a permanent liner for the overcap.

Referring now to FIG. 2, dust covers 28 are provided with a depending inwardly-extending annular skirt 17 to engage shoulder 18 of rim 19. The dust covers are constructed of a resilient or pliable material so that they can snap into place about the rim of the container, take up any tolerances in the glass finish and retain the dust cover liner in place after they are applied. However, it is not intended to restrict the invention to the use of any particular design of dust cover liner, since it is contemplated that any dust cover familiar to those persons skilled in the art which will securely engage the annular groove of the container upon pressure application and is removable by means of a cap removal chute hereinafter described is within the scope of this invention. But as preferred examples, the dust cover liner 28 may be formed of polyvinyl chloride, combinations of vinyl chloride-vinyl acetate and like compounds now available, and the butydiene-styrene injection moldable rubbers, or similar elastomeric or thermoplastic materials.

After dust cover liners 28 have been snapped onto shoulder 18 of bottles 20, the bottles move along the continuously moving horizontal conveyor 21 as shown in FIG. 1 to an adhesive application station 36 where a pressure-sensitive adhesive or a heat-sensitive adhesive is either applied to the top panel of dust cover liner 28 by means of rollers 36 or by means of any other adhesive applicator known in the art, or the adhesive is applied to the underside of later applied overcap 29. But if dust cover liners 28 are to be mechanically locked to the underside of overcap 29, then the bottles would move directly from dust cover supply 31 to overcap application chute 23.

Figure 3:
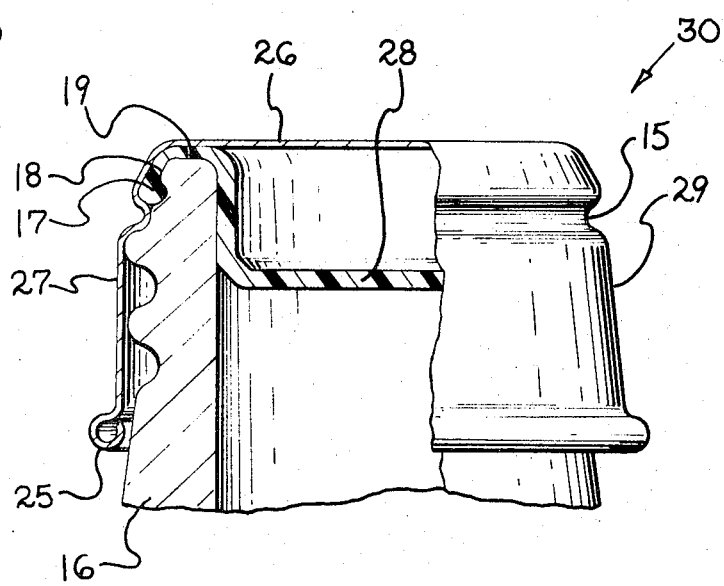
FIG. 3 is a fragmentary detailed sectional view of a combined dust cover liner and a roll-on overcap prior to deforming said overcap to the container wherein the cover liner and overcap are secured together so that the dust cover becomes a permanent liner for the overcap.

At the overcap supply station, a rigid final overcap or shell 29 is caused to pass from supply area 32 through chute 23 and is telescoped over dust cover liner 28 to form composite closure 30. As shown in FIGS. 2 and 3 respectively, the overcap may be the conventional crown type cap or the roll-on type cap. Both types of caps include a top wall section 26 which is attached to annular depending skirt 27. The roll-on overcap as shown in FIG. 3 also includes an annular radially inward extending groove 15 which securely engages skirt 17 of liner 28 when said overcap is telescoped over said liner. In this manner, liner 28 will be retained within overcap 29 upon removal of the overcap to form composite closure 30. It is contemplated within this invention that if liners 28 are to be mechanically retained within overcap 29, they can be securely positioned within overcap 29 at supply area 32.

However, if liners 28 are retained within overcap 29 by means of an adhesive, then composite closure 30 formed at chute 23 is struck by a pressure roller 37 or some other pressure applying device, in the case of a pressure sensitive adhesive, or subjected to a heat treatment process, in the case of a heat sensitive adhesive, causing dust cover liner 28 to adhere to the underside of the top wall of overcap 29. At this point after dust cover liner 28 has been either mechanically or adhesively retained within overcap 29, the dust cover acts as a permanent liner for composite closure 30.

After the composite closure 30 has been formed upon the finish 16 of bottles 20, the unfilled bottles move to a closure removal chute 24. As the bottles move forward on conveyors, the cap removal chute engages composite closure 30 at the lower edge 25, as shown in FIGS. 2 and 3, of skirt 27 of overcap 29. Cap removal chute 24 is arc-shaped to facilitate the removal of closure 30 from the unfilled containers 20. As these containers move forward under removal chute 24, the edge 25 of overcap 29 strikes the inside bottom track 39 of the chute. Composite closure 30 is pulled from finish portion 16 by a force resulting from the weight of the bottle. This force is applied to edge 25 at the point where the edge contacts the inside track 39 of chute 24. Composite closure 30 is then vacuum conveyed to a storage area 33 to be later applied to the container after the latter has been filled.

The empty bottles 20 enter a filling station 34. Thereafter, the filled bottles move to the capping station 40 where the composite closure 30, which includes permanent liner 28 and rigid overcap 29, is telescoped over finish 16 of bottle 20. The attaching skirt 27 of overcap 29 is crimped or deformed, effecting a hermetic seal for the container. In this manner, it is possible to provide a method of filling and sealing a container wherein the dust cover which was previously applied at the bottle manufacturer's plant is removed by the use of an overcap prior to filling such that the dust cover becomes a permanent liner within the overcap. The overcap and liner are then applied to the bottle after the bottle has been filled with the desired product. The composite closure comprises the two pieces of the resilient snap-on dust cover liner and the telescopic outer rigid cap which is crimped or deformed on the container finish to seal the container.

Modifications of the above-detailed description may be resorted to within the spirit and scope of the appended claims.

I claim:
1. The method of sealing a container which consists in:
 (a) positioning a liner that serves as a dust cover for a container over the mouth opening of an unfilled container,
 (b) superposing a rigid shell over said liner so that it is telescopically aligned with the finish portion of said container,
 (c) removing simultaneously the rigid shell and the liner from the opening of the container prior to filling,
 (d) filling the container with the desired product,
 (e) reapplying simultaneously the rigid shell and liner telescopically onto the finish portion of the filled container, and
 (f) securing the rigid shell to the container, thereby sealing the container.

2. The method which consists in:
 (a) closing the opening of an unfilled container with a resilient liner that serves as a dust cover, which liner includes a top portion and an annular skirt attached thereto,
 (b) pressing a rigid shell, which includes a top wall portion and an annular skirt attached thereto, telescopically over said liner and simultaneously securing said liner to the top wall of said shell,
 (c) removing simultaneously the combined shell and liner from the opening of the container prior to filling,
 (d) filling the container with the desired product, (e) reapplying simultaneously the combined shell and liner to the mouth of the filled container, and
(f) securing the rigid shell to the container, thereby sealing the container.

3. The method as claimed in claim 2, wherein the mouth opening of said container is closed by placing thereon a snap-on type cap cover liner.

4. The method as claimed in claim 2, wherein the liner is secured to the top wall of said shell by forcibly engaging the skirt of said liner within the skirt of said shell.

5. The method as claimed in claim 4 wherein the skirt of said liner is forcibly engaged within an annular groove imposed within the skirt of said shell, thereby facilitating the simultaneous removal of said liner and said shell.

6. The method which consists in:
(a) closing the mouth opening of an unfilled container with a liner that serves as a dust cover for the container, which liner comprises a top wall portion and an annular skirt portion attached thereto,
(b) pressing a rigid shell, which includes a top wall portion and an annular skirt portion attached thereto, telescopically over said liner so that the top wall of said shell contacts the top wall portion of the dust cover liner,
(c) bonding the top wall portion of the dust cover liner to the top wall of said shell, thereby forming a composite closure assembly,
(d) removing the composite closure assembly from the mouth of the container prior to filling the container,
(e) filling the container with the desired product,
(f) reapplying the composite closure assembly telescopically over the finish portion of the filled container, and
(g) securing the assembly to the container, thereby sealing the container.

7. The method which consists in:
(a) closing the mouth opening of a container with a liner that serves as a dust cover, which liner includes a top wall portion and an annular skirt attached thereto,
(b) coating the top portion of said liner with an adhesive,
(c) pressing a rigid shell, which includes a top wall portion and an annular skirt attached thereto, telescopically onto the finish portion of said container and over said liner,
(d) bonding the dust cover liner to said shell, thereby forming a combined shell and liner,
(e) removing simultaneously the combined shell and liner from the mouth of the container prior to filling the container,
(f) filling the container with the desired product,
(g) reapplying simultaneously the combined shell and liner telescopically over the finish portion of the filled container, and
(h) deforming the skirt of said rigid shell to secure said shell to the finish of said container, thereby sealing the container.

8. The method as claimed in claim 7, wherein the mouth opening of said container is closed by placing thereon a snap-on type dust cover liner.

9. The method as claimed in claim 7, including the step of coating the liner with a heat-sensitive adhesive.

10. The method as claimed in claim 9, including the step of heating the combined dust cover and shell, thereby permanently bonding the dust cover liner to the shell.

11. The method as claimed in claim 7, including the step of coating the liner with a pressure-sensitive adhesive.

12. The method as claimed in claim 11, including the step of striking the top of said shell, thereby permanently bonding the dust cover liner to the shell.

13. The method which consists in:
(a) closing the mouth opening of a container with a dust cover liner, which liner includes a top wall portion and an annular skirt portion attached thereto,
(b) coating the bottom portion of the top wall of a rigid shell with an adhesive,
(c) pressing said rigid shell telescopically onto the finish portion of said container and over said liner so that the bottom portion of the top wall of said shell contacts the top wall portion of the combination dust cover and dust cover liner,
(d) bonding the dust cover liner to the top wall of said shell, thereby forming a combined shell and liner,
(e) removing simultaneously the combined shell and liner from the mouth of the container prior to filling the container,
(f) filling the container with the desired product,
(g) reapplying simultaneously the combined shell and liner telescopically over the finish portion of the filled container, and
(h) deforming the skirt of said rigid shell to sealingly secure said shell to the finish of said container, thereby sealing the container.

14. The method as claimed in claim 13, wherein the mouth opening of said container is closed by placing thereon a snap-on type combination dust cover and cap cover liner.

15. The method as claim in claim 13, including the step of coating the bottom portion of the top wall of said shell with a heat-sensitive adhesive.

16. The method as claimed in claim 15, including the step of heating the combined dust cover liner and shell, thereby permanently bonding the dust cover to the shell.

17. The method as claimed in claim 13, including the step of coating the bottom portion of the top wall of said shell with a pressure-sensitive adhesive.

18. The method as claimed in claim 17, including the step of striking the top of said shell, thereby permanently bonding the dust cover to the shell.

References Cited

UNITED STATES PATENTS

| | | | |
|---|---|---|---|
| 2,995,882 | 8/1961 | Barnby | 53—381X |
| 3,494,094 | 2/1970 | Downs et al. | 53—37X |

THERON E. CONDON, Primary Examiner

R. L. SPRUILL, Assistant Examiner

U.S. Cl. X.R.

53—37, 41, 42, 381